United States Patent [19]

Greenstein et al.

[11] Patent Number: 4,512,034

[45] Date of Patent: Apr. 16, 1985

[54] TECHNIQUE FOR DIGITAL RADIO SPACE DIVERSITY COMBINING

[75] Inventors: Lawrence J. Greenstein, Edison; Yu S. Yeh, Freehold, both of N.J.

[73] Assignee: AT&T Bell Laboratories, Murray Hill, N.J.

[21] Appl. No.: 512,603

[22] Filed: Jul. 11, 1983

[51] Int. Cl.[3] .............................................. H04B 7/08
[52] U.S. Cl. .................... 455/139; 455/276; 455/278; 455/304
[58] Field of Search ............... 455/52, 65, 137–139, 455/273, 276, 278, 304; 375/100, 102

[56] References Cited

U.S. PATENT DOCUMENTS

| | | | |
|---|---|---|---|
| 4,261,056 | 4/1981 | Barnett et al. | 455/273 |
| 4,283,795 | 8/1981 | Steinberger | 455/283 |
| 4,320,535 | 3/1982 | Brady et al. | 455/278 |
| 4,326,294 | 4/1982 | Okamoto et al. | 455/139 |
| 4,354,276 | 10/1982 | Karabinis | 455/276 |
| 4,373,207 | 2/1983 | Hecken | 455/139 |
| 4,373,210 | 2/1983 | Karabinis et al. | 455/273 |
| 4,384,358 | 5/1983 | Shiki et al. | 455/137 |

FOREIGN PATENT DOCUMENTS 128935  10/1980  Japan ............................. 455/138

OTHER PUBLICATIONS

ICC '80 Conference Record, vol. 3 of 3, International Conference on Communications, Seattle, WA, Jun. 8–12, 1980, "Performance of 16-QAM Digital Radio System Using New Space Diversity" by S. Komaki et al., pp. 52.2.1–52.2.6.

*Primary Examiner*—Marc E. Bookbinder
*Attorney, Agent, or Firm*—Erwin W. Pfeifle

[57] ABSTRACT

The present invention relates to a space diversity combiner which includes two branches wherein separate multipath signals received from a remote source are propagated. The branch signals are combined and the combiner output signal is used for obtaining noncoherent spectrum measurements which are in turn used to account for both dispersion and noise in controlling the relative amplitudes and phases of the two branch signals to provide a maximum performance measure for the combiner.

5 Claims, 2 Drawing Figures

FIG. I

TECHNIQUE FOR DIGITAL RADIO SPACE DIVERSITY COMBINING

BACKGROUND OF THE INVENTION

1. Field of the Invention

The present invention relates to a technique for digital radio space diversity combining and, more particularly, to a digital radio space diversity combiner which includes two branches wherein separate multipath signals received from a remote source on separate antennas are propagated. The branch signals are combined, and the output signal is used for obtaining noncoherent spectrum measurements which are used to account for both dispersion and noise in controlling the relative amplitudes and phases of the signals propagating in the two branches.

2. Description of the Prior Art

In a terrestrial digital radio link, frequency selective fading caused by multipath propagation presents the major threat to system availability. Efforts to reduce channel dispersion, and thus to increase channel availability, typically center on the use of adaptive equalization and/or dual-branch space diversity. In this regard see, for example, U.S. Pat. No. 4,261,056 issued to W. T. Barnett et al on Apr. 7, 1981 relating to an equalizing signal combiner.

Most conventional space diversity schemes use either selection switching or so-called "in-phase" combining of the diversity branches. The latter approach concentrates on maximizing the combiner output power rather than on minimizing channel dispersion. Recently, however, techniques have dealt with "out-of-phase" combining, which reduces output dispersion by suitably adjusting the relative phases between the two branches. In this regard see, for example, the article "Performance of 16-QAM Digital Radio System Using New Space Diversity" by S. Komaki et al in ICC 80 Conference Record, Seattle, Wash., June 8-12, 1980, Vol. 3 at pages 52.2.1-52.2.6. Such approach can substantially eliminate dispersion for specific two-path propagation situations, but not under more general and realistic conditions.

Adaptive cross-polarization interference cancellation and adaptive signal interference cancellation arrangements are disclosed in U.S. Pat. Nos. 4,283,795, issued to M. L. Steinberger on Aug. 11, 1981 and 4,320,535 issued to D. M. Brady et al on Mar. 16, 1982, respectively. In such arrangements the combined signal is used to generate feedback signals which control the phase and amplitude of the interfering signal to provide interference cancellation.

The problem remaining in the prior art is to provide a space diversity combiner which provides adaptive control of the relative amplitudes and phases of the two branch gains prior to combining and search strategy that simultaneously accounts for both dispersion and noise.

SUMMARY OF THE INVENTION

The foregoing problem in the prior art has been solved in accordance with the present invention which relates to a technique for digital radio space diversity combining and, more particularly, to a digital radio space diversity combiner which includes two branches wherein separate multipath signals received from a remote source on separate antennas are propagated. The branch signals are combined, and the output signal is used for obtaining, for example, noncoherent spectrum measurements which are used to account for both dispersion and noise in controlling the relative amplitudes and phases of the signals propagating in the two branches.

Other and further aspects of the present invention will become apparent during the course of the following description and by reference to the accompanying drawings.

BRIEF DESCRIPTION OF THE DRAWINGS

Referring now to the drawing in which like numerals represent like parts in the several views.

DETAILED DESCRIPTION

Figure 1:
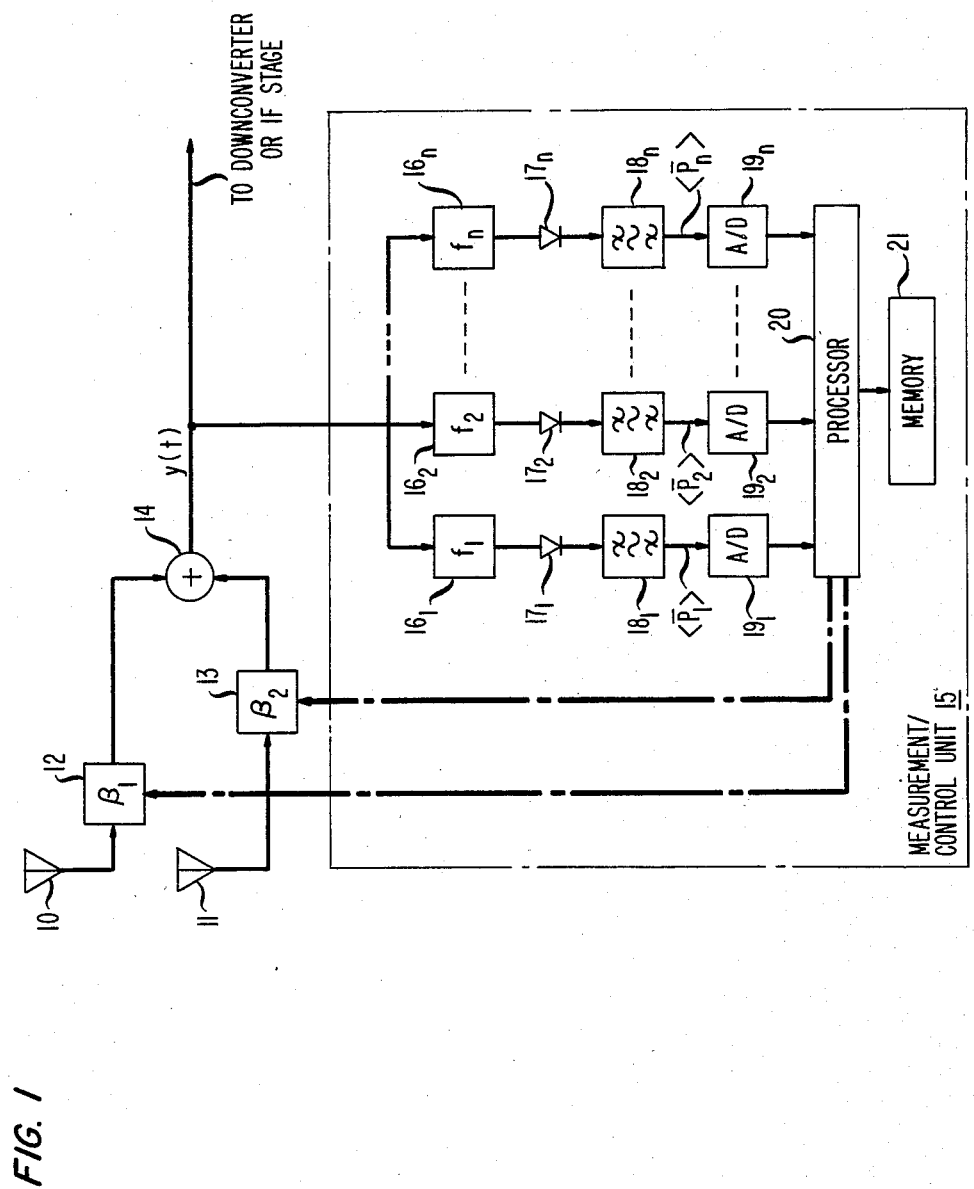
FIG. 1 is a block diagram of a space diversity combiner with an exemplary measurement/control arrangement in accordance with the present invention.

The idea of using both amplitude and phase adjustments in space diversity combining has yet to be fully understood and optimally exploited. To provide a basis for describing the present space diversity combiner, a discussion will be first presented to illustrate the potential power of this form of combining under quite general circumstances using the modeling of multipath fading responses.

Let $H_1(f)$ and $H_2(f)$ be the complex frequency responses of a fading channel as viewed by two vertically spaced receiver antennas. Under nonfading conditions, these functions are flat with frequency at unity amplitude ($|H_1(f)| = |H_2(f)| = 1$). In all that follows, f will be measured from the center of the radio channel, so that $H_1(f)$ and $H_2(f)$ are baseband functions. Moreover, interest is in their variations over just the interval $[-W/2, W/2]$, where W is the channel bandwidth. Since multipath fading arises from a finite number of discrete propagation paths, $H_1(f)$ and $H_2(f)$ can be presented in the general forms $$H_1(f) = \sum_{k=1}^{N_1} R_{1k} \exp\{-j(\omega\tau_{1k} - \theta_{1k})\} \quad (1)$$

and $$H_2(f) = \sum_{k=1}^{N_2} R_{2k} \exp\{-j(\omega\tau_{2k} - \theta_{2k})\} \quad (2)$$

In Equation (1), $N_1$ is the number of paths and $\tau_{1k}$, $R_{1k}$ and $\theta_{1k}$ are the time delay, amplitude and phase, respectively, associated with the kth path. Similar definitions apply to $N_2$, $\tau_{2k}$, $R_{2k}$ and $\theta_{2k}$ in $H_2(f)$.

Typically, microwave radio links with multipath exhibit delay spreads on the order of 8 nsec or less, i.e., the largest and smallest $\tau$-values differ by amounts small compared to $1/W$, where $W \leq 40$ MHz in the common carrier bands.

To be explicit, let $H_1(f)$ and $H_2(f)$ be represented by the infinite power series $$H_1(f) = e^{-j\omega t_1}[A_1 + j\omega B_1 + (j\omega)^2 C_1 + \ldots] \quad (3)$$

and $$H_2(f) = e^{-j\omega t_2}[A_2 + j\omega B_2 + (j\omega)^2 C_2 + \ldots] \quad (4)$$

where $t_1$ and $t_2$ are arbitrary, and the A's, B's and so on are complex coefficients. Using the power series expansion for $e^{jx}$, they can be easily related to the parameters of the functions of Equations (1) and (2), e.g., $$B_1 = \sum_{k=1}^{N_1} R_{1k} e^{j\theta_{1k}} (t_1 - \tau_{1k})^2. \tag{5}$$

The essence of first-order polynomial modeling is that given $H_1(f)$, a value for $t_1$ can be found such that $(A_1 + j\omega B_1)$ is the dominant part of Equation (3) over $[-W/2, W/2]$, all higher-order terms in $j\omega$ being small, in some sense. Similarly, a value for $t_2$ can be found that does the same for $H_2(f)$ in Equation (4). That such first-order polynomial fitting is achievable in channels with $W \leq 40$ MHz has been established using theory, noncoherently measured data, and coherently measured data.

Now suppose that a space diversity combiner is used with an adjustable time delay ($\tau$) and complex gain ($\beta$) in the second branch. The composite channel response, as viewed at the combiner output, would then be $$H(f) = H_1(f) + \beta e^{-j\omega\tau} H_2(f) \tag{6}$$

If $\tau$ and $\beta$ are adaptively adjusted to be $$\tau = t_1 - t_2; \beta = -B_1/B_2 \tag{7}$$

then $$H(f) = [A_1 - A_2 B_1/B_2] + \left\{ \begin{array}{c} \text{second-and} \\ \text{higher-order} \\ \text{terms in } j\omega \end{array} \right\} \tag{8}$$

Thus, by proper choice of delay and gain in one branch, the channel response can be made dispersionless except for small higher-order terms in $j\omega$. This is a quite general result for the channels of interest and shows the power of the combining approach in accordance with the present invention. If $\beta$ were a phase-only factor ($\beta = \exp(j\phi)$), such a strong reduction in dispersion would only be possible in the fortuitous situations where $|B_1| = |B_2|$.

The foregoing discussion suggests both a particular combiner structure, Equation (6), and particular solutions, Equation (7), for the variable parameters. It is to be understood that the foregoing discussion was intended, however, to provide insight rather than to identify a specific design approach. For one thing, a variable time delay would be difficult to implement and would offer little incremental benefit in most cases. In addition, the solutions of Equation (7) does not properly address either the residual dispersion or the receiver noise. If, for example, $A_1/B_1$ and $A_2/B_2$ happened by chance to be close in value, the first term in Equation (8) would be severely weakened in the process of eliminating the $j\omega$ term; this would enhance the effects of both the remaining dispersion and the noise.

Accordingly, a combiner is proposed in accordance with the present invention in which relative amplitudes and phases in the two diversity branches are adaptively adjusted, but not delays. Moreover, the use of control strategies are suggested that take proper account of the total dispersion and the noise. Specific schemes for doing so are described shortly.

In the present space diversity combiner, the use of two variable gains, $\beta_1$ and $\beta_2$, as shown in FIG. 1 are provided. Thus, $$H(f) = \beta_1 H_1(f) + \beta_2 H_2(f) \tag{9}$$

By this arrangement, any relative gain adjustment can be achieved using attenuations only, as, for example, either $|\beta_1| = 1$ and $|\beta_2| \leq 1$ or vice versa. Whether $\beta_1$ should be strictly real (amplitude adjustments only) or complex (amplitude and phase adjustment) depends on the purpose of the combining and the consequent adaptation strategy.

Turning now to FIG. 1 which is a block diagram of an exemplary space diversity combiner in accordance with the present invention, multipath signals received at a first and a second antenna 10 and 11 from a remote transmitter are transmitted to a first and a second gain and phase adjusting arrangements 12 and 13, respectively, over separate paths. For exemplary purposes only, it will be assumed hereinafter that adjusting arrangement 12 is adapted to only modify the amplitude, or gain, of the signal passing therethrough from antenna 10 in response to predetermined control signals. Additionally, it will be assumed hereinafter that adjusting arrangement 13 is adapted to modify both the amplitude and the phase of the signal passing therethrough from antenna 11 in response to predetermined control signals.

The modified output signals from adjusting arrangements 12 and 13 are then combined in an adder circuit 14 and the resultant output signal, designated y(t), is both transmitted to a downconverter or Intermediate Frequency (IF) stage and a Measurement/Control Unit 15, which provides a feedback path for generating the predetermined control signals for controlling the adjusting arrangements 12 and 13. Measurement/Control unit 15 is shown as including a plurality of n narrowband filters $16_1 - 16_n$ each having a separate bandwidth b that passes a separate subband of the overall combined output signal, y(t), bandwidth. More particularly, filter $16_1$ passes a first portion, or subband, of the overall output signal from adder 14 while rejecting all other frequency portions, filter $16_2$ passes a separate portion, or subband, of the overall output signal from adder 14, and in a similar manner each of the remaining filters $16_3 - 16_n$ pass a separate portion, or subband, of the output signal from adder 14.

Each of the output signals from filters $16_1 - 16_n$ are then transmitted through a separate one of detectors $17_1 - 17_n$ which are envelope detectors that measure the magnitude of the envelope of the subband of H(f) passed by the associated filter $16_i$, where H(f) is the complex frequency response of the channel. The output from each of detectors $17_1 - 17_n$ is passed through a separate one of n lowpass filters $18_1 - 18_n$ which only pass the low frequency or d-c components of the output signal from the associated detector $17_i$. The output signal from each of lowpass filters $18_1 - 18_n$ is then passed through a separate one of n analog-to-digital converters (A/D) $19_1 - 19_n$ to provide a digital value of the output signal from the associated lowpass filters $18_i$. The n output signals from digitizers $19_1 - 19_n$ are used by a processor 20 to compute the performance measure, $\rho_M$, and generate therefrom the appropriate control signals to be fed back to adjusting arrangements 12 and 13 to minimize the noise and dispersion at the output of adder 14.

From FIG. 1, it can be seen that in accordance with the present space diversity combiner, multipath signals are received at two spaced-apart antennas 10 and 11, a separate variable gain or gain and phase adjusting means 12 and 13 is provided in separate branches, and a measurement/control unit 15 is provided for generating control signals for adaptive control of the relative amplitudes and phases of the two branch gains. The control signals are generated based on noncoherent spectrum measurements at the output of the combining means, which measurements are used in calculations which simultaneously account for both dispersion and noise to maximize the performance measure of the present combiner.

More particularly, it is to be understood that an objective to be attained by the present invention is to minimize the complexity of the adaptive equalizers following the combiner. Thus, in radio links for which combining is not sufficient by itself, additional equalization would be mandated. In such cases, the use of space diversity to mitigate dispersion while also taking account of noise could make the difference between attainable/economical and impractical/costly equalizer design.

In the present strategy, when follow-on equalization is to be used, the values of $\beta_1$ and $\beta_2$ should be chosen to minimize the dispersion in H(f), Equation (9), thereby simplifying the demands on the equalizer, e.g., minimizing the required number of taps. At the same time, dispersion should not be minimized at an undue cost in noise, for, once the signal-to-noise ratio at the combiner output is severely compromised, the damage cannot be undone. In the present approach, $\beta_1$ (real) and $\beta_2$ (complex) are chosen to maximize an appropriate composite measure of signal, distortion and noise at the combiner output. The measure is computed from some odd number ($n_1$) of evenly-spaced samples of $|H(f)|$.

The combiner output, y(t) in FIG. 1, has a total power spectral density given by $$P_y(f) = P(f)|H(f)|^2 + N_o[|\beta_1|^2 + |\beta_2|^2]|H_R(f)|^2 \quad (10)$$

$\underbrace{\phantom{P(f)|H(f)|^2}}_{\text{Signal}} \quad \underbrace{\phantom{N_o[|\beta_1|^2 + |\beta_2|^2]|H_R(f)|^2}}_{\text{Noise}}$ where $N_o$ is the spectral density of the receiver input noise, $H_R(f)$ represents whatever receiver selectivity precedes the combiner output, and P(f) is the spectral density of the signal (excluding channel and combiner effects). More specifically, $$P(f) = P_o|H_T(f)|^2|H_R(f)|^2 \quad (11)$$

where $|H_T(f)|^2$ represents the spectral shaping in the transmitter and $P_o$ is a spectral density scale factor.

All functions and parameters in Equations (10) and (11) are design-specified except $|\beta_1|$ and $|\beta_2|$, which are controlled by the combiner circuitry, and $|H(f)|$, which must be measured in real time. The present approach estimates $|H(f)|$ at n evenly-spaced frequencies within the channel bandwidth by estimating the corresponding values of $P_y(f)$, Equation (10). Based on these estimates, $\beta_1$ and $\beta_2$ are adjusted to maximize a computed performance measure, $\rho_m$, which will be introduced shortly. Before doing so, the following are defined:

$$\Delta f \triangleq \text{Spacing between estimates of } |H(f)|, \quad (12)$$
$$\text{where } (n_1 - 1)\Delta f \leq W;$$

-continued $$H_n \triangleq |H(f_n)|, f_n = n\Delta f(n = 0, \pm 1, \ldots \pm(n_1)/2); \quad (13)$$

$$\overline{H} \triangleq \underset{n}{\text{Ave}} \{H_n\} = \text{Average signal gain}; \quad (14)$$

$$S \triangleq \underset{n}{\text{Ave}} \{P(f_n)\} (\overline{H})^2 W = \text{Signal power} \quad (15)$$

$$D \triangleq \underset{n}{\text{Ave}} \{P(f_n)(H_n - \overline{H})^2\} W = \text{Distortion Power} \quad (16)$$

$$N \triangleq N_o(|\beta_1|^2 + |\beta_2|^2) \underset{n}{\text{Ave}} \{|H_R(f_n)|^2\} W \quad (17)$$
$$= \text{Noise Power}$$

where W and T are the channel bandwidth and digital symbol period, respectively. All quantities in these equations are known a priori except the $H_n$-values, which are measured.

The performance measure to be computed by processor 20 and maximized, namely, the signal-to-(distortion plus noise) ratio can now be defined as:

$$\rho_M \triangleq S/(D + N) \quad (18)$$

In typical radio links, noise will not be a serious factor unless $H_1(f)$ and $H_2(f)$ are strongly faded. Therefore, maximizing $\rho_M$ will, in most cases, amount to minimizing D/S, which is a measure of the dispersion in H(f). Including the term N, however, safeguards against minimizing D/S at an undue cost in signal (S) and thus seriously degrading the signal-to-noise ratio.

The control strategy can, therefore, be described as follows. At the combiner output, a parallel bank of envelope detectors $17_1$–$17_n$ is used to estimate $|H(f)|$ at n separate frequencies. The spectral samples are digitized in digitizers $19_1$–$19_n$ and applied to a microprocessor 20, which computes $\rho_M$. This measure drives the search over $|\beta_1|$ (or $|\beta_2|$) and $\phi = \text{Arg}\{\beta_2\}$, i.e., these quantities are adjusted in adjusting arrangements 12 and 13 so as to maximize $\rho_M$. Typically, they are adjusted iteratively, e.g., $\phi$ is changed in, for example, 0.1-radian steps until a local maximum is found; then $|\beta_1|$ is changed from 1 in steps of, for example, 0.1 until a maximum is found; and this process repeats, possibly using smaller steps in successive rounds, until $\rho_M$ can no longer be increased by varying either $\beta$ or $\phi$.

A scheme for measuring $H_n$ at each of $n_1$ frequencies will now be described. To see how accurate estimates of $H_n$ might be obtained, let G(f) represent a low-pass power gain function with bandwidth b<<W. The measurement of $H_n$ is best seen as involving a bandpass filter $16_i$ with power response $G(f - \nu\Delta f)$ followed by envelope detection $17_i$ and $t_M$-second averaging of the detector output. Referring to Equation (10), the average power passed by the bandpass filter $16_i$ will be $$\overline{P}_n = \int \{P(f)|H(f)|^2 + N_o(|\beta_1|^2 + |\beta_2|^2)|H_R(f)|^2\}G(f - n\Delta f)df \quad (19)$$

where P(f) is defined by Equation (11). Assuming a square-law detector, the time-averaged detector output will be $$<\bar{P}_n> = \bar{P}_n + \left\{ \begin{array}{l} \text{Fluctuation Noise;} \\ \text{Variance } \sim \bar{P}_n/bt_M \end{array} \right\}. \quad (20)$$

We now define two constants related to the system design functions, namely, $$\eta_n \triangleq N_o \int |H_R(f)|^2 G(f - n\Delta f) df \quad (21)$$

and $$\zeta_n \triangleq \int P(f) G(f - n\Delta f) df. \quad (22)$$

Based on Equation (19) and the fact that H(f) changes little over the bandwidth b, microprocessor 20 can estimate $H_n$ using the formula $$H_n = \sqrt{\frac{<\bar{P}_n> - \eta_n[|\beta_1|^2 + |\beta_2|^2]}{\zeta_n}} \quad (23)$$

where $<\bar{P}_n>$ is measured in real time; $|\beta_1|$ and $|\beta_2|$ are controlled parameters of known value; and $\eta_n$ and $\zeta_n$ are predetermined constants.

Inserting Equations (19)–(22) into Equation (23) produces $$\hat{H}_n = \sqrt{\frac{\int P(f)G(f - n\Delta f)|H(f)|^2 df}{\int P(f)G(f - n\Delta f) df}} + \left\{ \begin{array}{l} \text{Term Due} \\ \text{Fluctuation Note} \end{array} \right\} \quad (24)$$

When b=0, the first term under the radical sign is precisely $(H_n)^2$, so that the only imprecision in $\hat{H}_n$ is due to fluctuation noise. More generally, the first term is accurate so long as $|H(f)|^2$ changes little over the passband of $G(f-n\Delta f)$. If one considers, for example, propagation media with delay spreads of 8 nsec or less, the condition $b \leq 1$ MHz should permit more than adequate resolution. To achieve low fluctuation noise as well, the condition $t_M \geq 1000/b$ should be satisfied. Thus, with b=1 MHz and $t_M = 1$ msec, $H_n$ can be estimated with high accuracy. This also leaves adequate time for numerous iterations of the search over $\beta_1$ and $\beta_2$.

Figure 2:
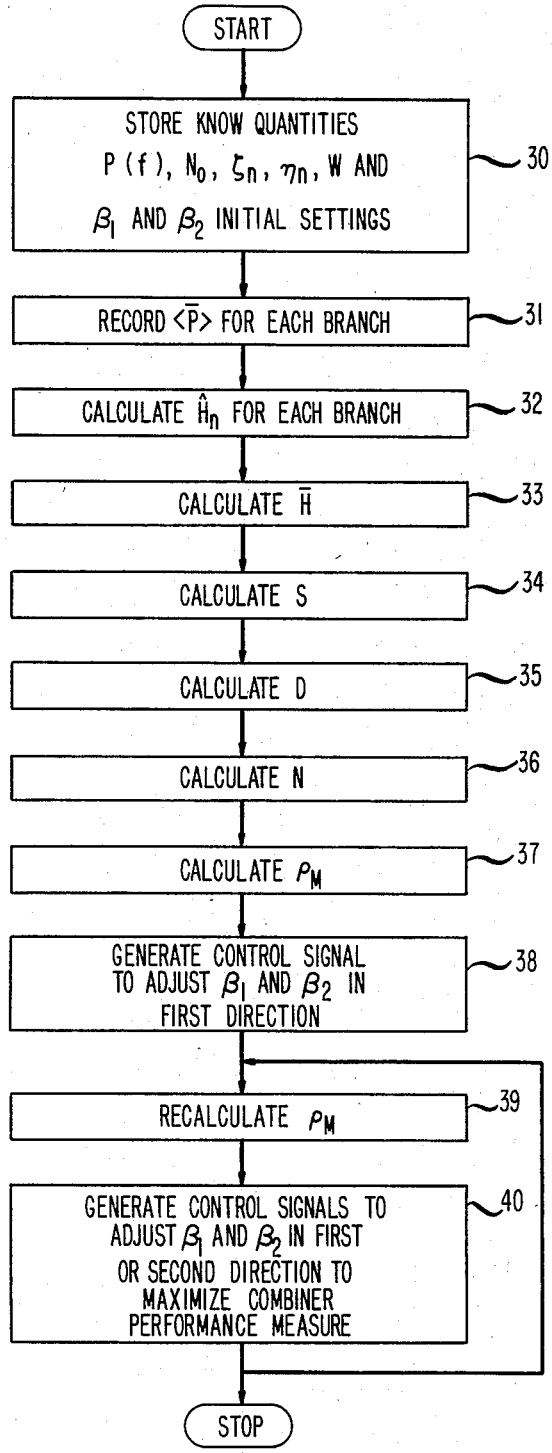
FIG. 2 is a flow diagram of an exemplary sequence for the processor of FIG. 1 in generating control signals which maximize the performance measure of the combiner.

FIG. 2 illustrates an exemplary sequence which processor 20 might go through to compute the performance measure of the combiner and generate control signals to adjusting arrangements 12 and 13 for maximizing the performance measure of the combiner. It is to be understood that the sequence of FIG. 2 is merely for purposes of illustration and not for purposes of limitation since other similar sequences could be substituted. On initialization, processor 20 requires certain constants and predetermined system parameters in determining the performance measure of the combiner. Therefore, in box 30 of FIG. 2, such constants and parameters as P(f) (shown in Equation 11), $N_0$ (the noise intensity of the system which is known or measured), $\zeta_n$ (the power of the signal measured by the associated narrowband filter and shown in Equation 22), $\eta_n$ (the noise measured by the narrowband filter and shown in Equation 21), W (the combiner output signal bandwidth) and the original settings of $\beta_1$ and $\beta_2$ are stored in a processor memory 21.

Processor 20, once combining starts, records the output signal from each of digitizers $19_1 - 19_n$ in memory 21 as shown in box 31 of FIG. 2, and calculates the values of $\hat{H}_n$ for each measured signal per equation (23) or (24). Processor 20 then can calculate the value of $\bar{H}$ per equation (14) followed by the values of S, D and N per equations (15), (16) and (17), respectively, as shown in respective boxes 33–36 of FIG. 2. Once the values for S, D, and N are found, the signal-to-(distortion plus noise) ratio can be determined from equation (18), and in response thereto control signals generated to adjusting arrangements 12 and 13 as shown in boxes 37 and 38, respectively, of FIG. 2. As stated hereinbefore, the adjusting arrangements 12 and 13 are adjusted in a first direction from the original setting and the above process repeated to see if $\rho_M$ is improved or not as shown in box 39 of FIG. 2.

If an improvement is noted in the performance measure, the control signals are transmitted to adjusting arrangements 12 and 13 to further adjust these components in a first direction from the original setting. If, however, the performance measure has decreased, the control signals are transmitted to adjusting arrangements 12 and 13 to adjust them in a second direction and return them to the original setting, with such adjustments being shown in box 40 of FIG. 2. This process is repeated and the adjustments made until a maximized performance measure is achieved.

It is to be understood that processor 20 can comprise any suitable arrangement such as a microprocessor or other small processor with associated memory for storing the necessary program and elements of the determinations made during the course of such processing, or a hardwired logic arrangement for accomplishing the same effect. Additionally, it is to be understood that adjusting arrangements 12 and 13 can comprise an adjustable attenuator if the amplitude, or gain, only is to be adjusted or an adjustable attenuator and a phase shifter in series if both the amplitude and phase are to be adjusted.

What is claimed is:

1. A space diversity combiner comprising:
a first and a second branch capable of propagating a first and a second concurrent input signal, respectively, received from a remote transmitter over separate channel paths
gain and phase adjusting means disposed in relation to the first and second branches and capable of adjusting the relative gain and phases of the first and second input signals in a predetermined manner in response to control signals to provide adjusted first and second input signals;
means for combining the adjusted first and second input signals at the output of the gain and phase adjusting means for generating a combiner output signal; and
measurement and control means responsive to the combiner output signal for generating noncoherent spectrum measurements over the frequency band of the combiner output signal and computing therefrom a performance measure for the space diversity combiner which accounts for both dispersion and noise and, in response to such computation, generating and applying said control signals to the gain and phase adjusting means for adjusting the relative amplitude and phase of the first and second input signals to maximize said performance measure computation.

2. A space diversity combiner in accordance with claim 1 wherein said gain and phase adjusting means comprises:
- a gain adjusting arrangement disposed in the first branch which is capable of adjusting the gain of the first input signal in response to a first control signal from the measurement and control means; and
- a gain and phase adjusting arrangement disposed in the second branch capable of adjusting the gain and the phase of the second input signal in response to a second control signal from the measurement and control means for adjusting the relative gain and phase between the first and second input signals in a predetermined manner to maximize the performance measure of the space diversity combiner.

3. A space diversity combiner in accordance with claim 1 wherein the measurement and control means comprises:
- means for measuring the magnitude of the frequency response, $|H(f)|$, of channel paths at a plurality of separate frequency subbands of the combiner output signal frequency spectrum;
- processor means for calculating S and D in response to the plurality of frequency subband measurements from the measuring means, for calculating N from known values of branch gains and for calculating the performance measure, $p_M$, in accordance with the relationship $$p_M = S/(D+N)$$

where S is the combiner output signal power, D is the combiner output distortion power, and N is the combiner output noise power, said processor means being responsive to the performance measure calculation for generating control signals to the gain and phase adjusting means for adjusting the relative gain and phase of the first and second input signals by a predetermined amount for maximizing the performance measure of the combiner.

4. A space diversity combiner in accordance with claim 3 wherein the means for measuring the channel frequency responses comprises:
- a plurality of n passband filtering means capable of passing a different frequency subband of the combiner output signal frequency spectrum;
- a plurality of n envelope detecting means, each envelope detecting means being coupled to the output of a separate one of the plurality of n passband filtering means and capable of measuring the power of the envelope of the signal at the output of the associated filtering means.

5. A space diversity combiner in accordance with claim 4 wherein the means for measuring the channel frequency responses further comprises:
- a plurality of n lowpass filtering means, each lowpass filtering means being coupled to a separate one of the n envelope detecting means for passing only the low frequency components of an output signal from the associated envelope detecting means; and
- digitizing means for generating a separate digital representation of the output signal from each of the lowpass filtering means for transmission to the processor means.

* * * * *